United States Patent
Agrawal et al.

(10) Patent No.: US 10,155,899 B2
(45) Date of Patent: Dec. 18, 2018

(54) METHODS OF FORMING SUSPENSIONS AND METHODS FOR RECOVERY OF HYDROCARBON MATERIAL FROM SUBTERRANEAN FORMATIONS

(71) Applicant: Baker Hughes, a GE company, LLC, Houston, TX (US)

(72) Inventors: Devesh Kumar Agrawal, Houston, TX (US); Sankaran Murugesan, Katy, TX (US); Valery N. Khabashesku, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 14/744,520

(22) Filed: Jun. 19, 2015

(65) Prior Publication Data
US 2016/0369157 A1   Dec. 22, 2016

(51) Int. Cl.
*C09K 8/58* (2006.01)
*E21B 43/16* (2006.01)
*E21B 43/20* (2006.01)

(52) U.S. Cl.
CPC ........... *C09K 8/58* (2013.01); *E21B 43/16* (2013.01); *E21B 43/20* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 3,617,347 | A | 11/1971 | Kuratomi |
| 3,762,882 | A | 10/1973 | Grutza |
| 3,980,549 | A | 9/1976 | Grutza |

(Continued)

FOREIGN PATENT DOCUMENTS

| | | |
|---|---|---|
| CN | 1380363 A | 11/2002 |
| CN | 101029359 A | 9/2007 |

(Continued)

OTHER PUBLICATIONS

"Mixture." Merriam-Webster.com. Merriam-Webster, n.d. Web. Dec. 21, 2017. (Year: 2017).*

(Continued)

*Primary Examiner* — Angela M DiTrani Leff
(74) *Attorney, Agent, or Firm* — TraskBritt (57) ABSTRACT

A suspension for removing hydrocarbons from a subterranean formation includes a fluid comprising at least one of water, brine, steam, carbon dioxide, a light hydrocarbon, and an organic solvent; and a plurality of nanoparticles dispersed with the fluid. Nanoparticles of the plurality comprise silica and carbon. A method includes forming a plurality of nanoparticles and dispersing the plurality of nanoparticles with a fluid to form a suspension comprising the nanoparticles. A method of recovering a hydrocarbon material includes introducing a suspension into a subterranean formation containing hydrocarbons, forming a stabilized emulsion of the suspension and the hydrocarbons within the subterranean formation; and removing the emulsion from the subterranean formation. The suspension comprises a plurality of nanoparticles, and at least some nanoparticles of the plurality comprise silica and carbon.

19 Claims, 2 Drawing Sheets

(56) References Cited

U.S. PATENT DOCUMENTS

| | | | |
|---|---|---|---|
| RE33,767 E | 12/1991 | Christini et al. | |
| 5,164,220 A | 11/1992 | Caballero | |
| 5,277,940 A | 1/1994 | Caballero | |
| 5,496,463 A | 3/1996 | Mori et al. | |
| 5,712,000 A | 1/1998 | Wei et al. | |
| 5,967,400 A | 10/1999 | Bell et al. | |
| 6,156,390 A | 12/2000 | Henry et al. | |
| 6,258,237 B1 | 7/2001 | Gal-Or et al. | |
| 6,286,498 B1 | 9/2001 | Sung | |
| 6,638,570 B2 | 10/2003 | Veerasamy | |
| 6,752,709 B1 | 6/2004 | Skibo et al. | |
| 7,201,972 B2 | 4/2007 | Shiozaki et al. | |
| 7,820,130 B2 | 10/2010 | Khabashesku et al. | |
| 7,858,186 B2 | 12/2010 | Khabashesku et al. | |
| 9,873,827 B2* | 1/2018 | Chakraborty | C09K 8/592 |
| 2003/0220204 A1 | 11/2003 | Baran, Jr. et al. | |
| 2003/0228249 A1 | 12/2003 | Fujimura et al. | |
| 2005/0287952 A1 | 12/2005 | Ryan et al. | |
| 2006/0169450 A1 | 8/2006 | Mang | |
| 2006/0269467 A1 | 11/2006 | Khabashesku et al. | |
| 2007/0126312 A1 | 6/2007 | Sung | |
| 2007/0158619 A1 | 7/2007 | Wang et al. | |
| 2007/0199826 A1 | 8/2007 | Son et al. | |
| 2007/0298669 A1 | 12/2007 | Barrera et al. | |
| 2009/0155479 A1 | 6/2009 | Xiao et al. | |
| 2009/0211758 A1 | 8/2009 | Bragg | |
| 2009/0242414 A1 | 10/2009 | Welz-Biermann et al. | |
| 2010/0019456 A1 | 1/2010 | Gerrard | |
| 2010/0028675 A1 | 2/2010 | Gogotsi et al. | |
| 2010/0096139 A1 | 4/2010 | Holcomb et al. | |
| 2010/0243248 A1 | 9/2010 | Golomb et al. | |
| 2011/0024299 A1 | 2/2011 | Reusmann | |
| 2011/0108269 A1 | 5/2011 | Van Den Berg et al. | |
| 2011/0278002 A1 | 11/2011 | McGuire | |
| 2012/0148762 A1 | 6/2012 | Wei et al. | |
| 2012/0175534 A1 | 7/2012 | Jung et al. | |
| 2012/0181029 A1* | 7/2012 | Saini | C04B 40/0633 166/307 |
| 2012/0245058 A1* | 9/2012 | Monteiro | C09K 8/032 507/110 |
| 2012/0285690 A1* | 11/2012 | Weaver | C09K 8/57 166/305.1 |
| 2013/0045897 A1* | 2/2013 | Chakraborty | B82Y 30/00 507/117 |
| 2013/0081335 A1 | 4/2013 | Mazyar et al. | |
| 2013/0165353 A1 | 6/2013 | Mazyar et al. | |
| 2013/0341022 A1 | 12/2013 | Nguyen et al. | |
| 2014/0096964 A1 | 4/2014 | Chakraborty et al. | |
| 2014/0187449 A1 | 7/2014 | Khabashesku et al. | |
| 2014/0290958 A1* | 10/2014 | Marr | E21B 37/06 166/311 |
| 2015/0047847 A1 | 2/2015 | Mazyar et al. | |
| 2015/0175807 A1 | 6/2015 | Jing et al. | |
| 2015/0225655 A1* | 8/2015 | Adams | C10G 25/003 516/138 |
| 2015/0353836 A1 | 12/2015 | Kuznetsov et al. | |
| 2015/0368539 A1* | 12/2015 | Tour | G01V 3/24 340/854.3 |

FOREIGN PATENT DOCUMENTS

| | | |
|---|---|---|
| CN | 102304737 A | 1/2012 |
| CN | 102354609 A | 2/2012 |
| CN | 102560415 A | 7/2012 |
| CN | 102719693 A | 10/2012 |
| CN | 102329976 B | 1/2013 |
| EP | 1826294 A1 | 8/2007 |
| JP | 62072511 A | 4/1987 |
| JP | 04157157 A | 5/1992 |
| JP | 2798523 B2 | 9/1998 |
| JP | 2006225730 A | 8/2006 |
| JP | 5010945 B2 | 8/2012 |
| JP | 2012200989 A | 10/2012 |
| KR | 1020080093625 A | 10/2008 |
| KR | 10-2009-0001161 A | 1/2009 |
| KR | 10-2009-0010406 A | 1/2009 |
| KR | 1020120027350 A | 3/2012 |
| KR | 1020130002085 A | 1/2013 |
| WO | 0075394 A1 | 12/2000 |
| WO | 2007148667 A1 | 12/2007 |

OTHER PUBLICATIONS

Krueger, Anke, "The structure and reactivity of nanoscale diamond," Journal of Materials Chemistry, 2008, vol. 18, pp. 1485-1492.

The Free Dictionary, "Steel", 2015, p. 1-6.

Jee et al., Surface Functionalization and Physicochemical Characterization of Diamond Nanoparticles, Current Applied Physics, vol. 9, No. 2, Mar. 2009, pp. e144-e147.

Tsubota et al., Composite Electroplating of Ni and Surface-Modified Diamond Particles with Silane Coupling Regent, Diamond & Related Materials, vol. 14, No. 3/7, Mar.-Jul. 2005, pp. 608-612.

Alvarado et al., Enhanced Oil Recovery: An Update Review, Energies, vol. 3, (2010), pp. 1529-1575.

Bryant et al., Development of Nanoparticle-Stabilized Foams to Improve Performance of Water-less Hydraulic Fracturing, Quarterly Progress Report, Oct. 1, 2013-Dec. 13, 2013, 16 pages.

Chakraborty et al., U.S. Appl. No. 14/519,496, filed Oct. 21, 2014, and titled Suspensions for Enhanced Hydrocarbon Recovery, and Methods of Recovering Hydrocarbons Using the Suspensions.

Chang et al., Electrodeposition of Aluminum on Magnesium Alloy in Aluminum Chloride (AlCl3)-1-Ethyl-3-Methylimidazolium Chloride (EMIC) Ionic Liquid and its Corrosion Behavior, Electrochemistry Communications, vol. 9, (2007), pp. 1602-1606.

Drexler et al., Amphiphilic Nanohybrid Catalysts for Reactions at the Water/Oil Interface in Subsurface Reservoirs, Energy & Fuels, vol. 26, (2012), pp. 2231-2241.

Kuznetsov et al., U.S. Appl. No. 14/289,838, titled Methods of Obtaining a Hydrocarbon Material From a Mined Material, and Related Stabilized Emulsions, filed May 29, 2014.

Kuznetsov et al., U.S. Appl. No. 14/296,857, titled Flocculants and methods for Recovering Bitumen From Oil Sands, filed Jun. 5, 2014.

Liu et al., Functionalization of Nanoscale Diamond Powder: Fluoro-, Alkyl-, Amino-, and Amino Acid-Nanodiamond Derivatives, Chem. Mater. vol. 16, (2004), pp. 3924-3930.

Luu et al., Nanoparticles Adsorbed at the Water/Oil Interface: Coverage and Composition Effects on Structure and Diffusion, American Chemical Society, Langmuir, vol. 29, (2013), pp. 7221-7228.

Mcelfresh et al., Application of Nanofluid Technology to Improve Recovery in Oil and Gas Wells, Society of Petroleum Engineers, (2012), SPE 154827, 6 pages.

Monteiro et al., U.S. Appl. No. 14/490,214 entitled, Methods of Coating Substrates with Composite Coatings of Diamond Nanoparticles and Metal, filed Sep. 18, 2014.

Shen et al., Emulsions Stabilized by Carbon Nanotube-Silicon Nanohybrids, Languir, vol. 25, No. 18, (2009), pp. 10843-10851.

Simka et al., Electrodeposition of Metals from Non-Aqueous Solutions, Electrochimica Acta, vol. 54, (2009), pp. 5307-5319.

Suresh et al., U.S. Appl. No. 14/169,432, titled Nano-Surfactants for Enhanced Hydrocarbon Recovery, and Methods of Forming and Using such Nano-Surfactants, filed Jan. 31, 2014.

Suresh et al., U.S. Appl. No. 14/289,873, titled Suspensions Including Organic Bases for Enhanced Oil Recovery and Methods of Obtaining Hydrocarbons Using Such Suspensions, filed May 29, 2014.

Suresh et al., U.S. Appl. No. 14/530,205 entitled, Compositions of Coated Diamond Nanoparticles, Methods of Forming Coated Diamond Nanoparticles, and Methods of Forming Coatings, filed Oct. 31, 2014.

Tsuda et al., Electrochemical Applications of Room-Temperature Ionic Liquids, The electrochemical Society Interface, Spring 2007, pp. 42-49.

(56) References Cited

OTHER PUBLICATIONS

Underwood, Ervin E., Quantitative Stereology, Addison Wesley Publishing Company, Inc., (1970), pp. 80-109.

Wasan et al., Spreading of Nanofluids on Solids, Nature, vol. 423, May 8, 2003, pp. 156-159.

Wu et al., Functionalization of Carbon Nanotubes by an Ionic-Liquid Polymer: Dispersion of Pt and PtRu Nanoparticles on Carbon Nanotubes and Their Electrocatalytic Oxidation of Methanol**, Angew. Chem. Int. Ed., vol. 48, (2009), pp. 4751-4754.

Xue et al., Functionalization of Graphene Oxide with Polyhedral Oligomeric Silsesquioxane (POSS) for Multifunctional Applications, Journal of Physical Chemistry Letters, vol. 3 (2012), pp. 1607-1612.

Helmenstine, T., Periodic Table of the Elements, Chemistry.About. Com, 2014, 1 page.

Baker et al., Luminescent Carbon Nanodots: Emergent Nanolights, Journal, 2010, 6726-6744, 19 pages, Angew. Chem. Int. Eg.

Li et al., Carbon nanodots: synthesis, properties and applications, Journal, Dec. 14, 2012, p. 24175-24478, vol. 22, No. 46, J. Mater. Chem.

Strauss et al., Carbon Nanodots—Towards a Comprehensive Understanding of their Photoluminescense, Journal, Nov. 4, 2014, 11 pages, American Chemical Society, Washington DC.

Kwon et al., Control of Photoluminescence of Carbon Nanodots via Surface Functionalization using Para-substituted Anilines, Sci. Rep. 5, 12604; doi: 10.1038/srep12604 (2015), p. 1-10.

International Search Report for International Application No. PCT/US2016/037516 dated Sep. 12, 2016, 3 pages.

International Written Opinion for International Application No. PCT/US2016/037516 dated Sep. 12, 2016, 5 pages.

Lou et al., Electroplating, Encyclopedia of Chemical Processing, Taylor & Francis, (2006), pp. 1-10.

Krueger; New Carbon Materials: Biological Applications of Functionalized Nanodiamond Materials; Chem. Eur. J.; 14, 1382-1390; 2008.

Neuman et al.; Silica Encapsulation of Fluorescent Nanodiamond for Colloidal Stability and Facile Surface Functionalization; J. Am.Chem. Soc.; 135, 7815-7818; 2013.

\* cited by examiner

METHODS OF FORMING SUSPENSIONS AND METHODS FOR RECOVERY OF HYDROCARBON MATERIAL FROM SUBTERRANEAN FORMATIONS

FIELD

Embodiments of the present disclosure relate generally to methods of recovering a hydrocarbon material from a subterranean formation. More particularly, embodiments of the disclosure relate to methods of forming a suspension including nanoparticles comprising silica and carbon, methods of recovering hydrocarbons using the nanoparticles, and to suspensions including the nanoparticles.

BACKGROUND

Water flooding is a conventional process of enhancing the extraction of hydrocarbon materials (e.g., crude oil, natural gas, etc.) from a subterranean formation. In this process, an aqueous fluid (e.g., water, brine, etc.) is injected into the subterranean formation through injection wells to sweep a hydrocarbon material contained within interstitial spaces (e.g., pores, cracks, fractures, channels, etc.) of the subterranean formation toward production wells. One or more additives may be added to the aqueous fluid to assist in the extraction and subsequent processing of the hydrocarbon material.

For example, in some approaches, a surfactant, solid particles (e.g., as colloids), or both, are added to the aqueous fluid. The surfactant and/or the solid particles can adhere to or gather at interfaces between a hydrocarbon material and an aqueous material to form a stabilized emulsion of one of the hydrocarbon material and the aqueous material dispersed in the other of the hydrocarbon material and the aqueous material. Surfactants may decrease the surface tension between the hydrocarbon phase and the water phase, such as in an emulsion of a hydrocarbon phase dispersed within an aqueous phase. Stabilization by the surfactant, the solid particles, or both, lowers the interfacial tension between the hydrocarbon and water and reduces the energy of the system, preventing the dispersed material (e.g., the hydrocarbon material, or the aqueous material) from coalescing, and maintaining the one material dispersed as units (e.g., droplets) throughout the other material. Reducing the interfacial tension increases the permeability and the flowability of the hydrocarbon material. As a consequence, the hydrocarbon material may be more easily transported through and extracted from the subterranean formation as compared to water flooding processes that do not employ a surfactant and/or solid particles. The effectiveness of the emulsion is determined in large part by the ability of the emulsion to remain stable and ensure mixing of the two phases.

However, application of surfactants is usually limited by the ability of the surfactant to sufficiently contact a large portion of a volume of hydrocarbons located within the subterranean formation and form an emulsion containing the hydrocarbons and the aqueous material carrying the surfactants. For example, the surfaces of the hydrocarbon-containing reservoir may not be sufficiently contacted by the surfactants, or the surfactants may not sufficiently adhere to hydrocarbon-bearing surfaces of the subterranean formation.

BRIEF SUMMARY

In some embodiments, a suspension for removing hydrocarbons from a subterranean formation includes a fluid comprising at least one of water, brine, steam, carbon dioxide, a light hydrocarbon, and an organic solvent; and a plurality of nanoparticles dispersed within the fluid. At least some nanoparticles of the plurality comprise both silica and carbon.

In other embodiments, a method includes forming a plurality of nanoparticles to comprise silica and carbon, and dispersing the plurality of nanoparticles with a fluid to form a suspension comprising the nanoparticles.

In certain embodiments, a method of recovering a hydrocarbon material includes introducing a suspension into a subterranean formation containing hydrocarbons, forming a stabilized emulsion of the suspension and the hydrocarbons within the subterranean formation; and removing the emulsion from the subterranean formation. The suspension comprises a plurality of nanoparticles, and at least some nanoparticles of the plurality comprise silica and carbon.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The following description provides specific details, such as material types, compositions, material thicknesses, and processing conditions in order to provide a thorough description of embodiments of the disclosure. However, a person of ordinary skill in the art will understand that embodiments of the disclosure may be practiced without employing these specific details. Indeed, embodiments of the disclosure may be practiced in conjunction with conventional techniques employed in the industry. In addition, the description provided below does not form a complete process flow for recovering hydrocarbons from a hydrocarbon-bearing subterranean formation. Only those process acts and structures necessary to understand the embodiments of the disclosure are described in detail below. A person of ordinary skill in the art will understand that some process components (e.g., pipelines, line filters, valves, temperature detectors, flow detectors, pressure detectors, etc.) are inherently disclosed herein and that adding various conventional process components and acts would be in accord with the disclosure. Additional acts or materials to extract a hydrocarbon material from a subterranean formation or from bitumen may be performed by conventional techniques.

As used herein, the singular foams "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially," in reference to a given parameter, property, or condition, means to a degree that one of ordinary skill in the art would understand that the given parameter, property, or condition is met with a small degree of variance, such as within acceptable manufacturing tolerances.

As used herein, the term "nanoparticle" means and includes particles having a mean diameter of less than about 1,000 nm (nanometers).

As used herein, the term "suspension" means and includes a material including at least one carrier material with which a material of a different phase is dispersed. A suspension of solid particles in a gaseous carrier fluid may also be referred to in the art as an aerosol or particulate. A suspension can also include a foam, in which a liquid or solid material forms discrete or connected pockets of a gas, or an aerosol, in which solid or liquid particles are dispersed in a gas.

As used herein, "mean diameter" refers to the number average particle size based on the largest linear dimension of the particle (sometimes referred to as "diameter"), whether the particle is spherical or not. Diameters, including average, maximum, and minimum particle sizes, may be determined by an appropriate method of sizing particles such as, for example, static or dynamic light scattering (SLS or DLS) using a laser light source.

Methods of recovering hydrocarbons from a subterranean formation using a suspension including nanoparticles of silica and carbon are described. In particular, nanoparticles that include carbon attached to or bonded to silica appear to have beneficial properties in excess of the properties of either silica or carbon alone. The suspension including such nanoparticles is introduced into the subterranean formation and contacts the hydrocarbons within the formation. Upon contacting the hydrocarbons, the suspension appears to reduce an interfacial tension between an aqueous phase and the hydrocarbon phase. For example, without being bound by any particular theory, it appears that nanoparticles enable a mechanism of separation based on "disjoining pressure." That is, nanoparticles adjacent interfaces between the aqueous phase, the hydrocarbon phase, and the surface of the formation may tend to form a wedge-like structure and between the hydrocarbon phase and the formation. Thus, the attraction between the hydrocarbon phase and the formation may be decreased, and the hydrocarbon may be more easily swept away from the formation. Such a process is described in Paul McElfresh, et al., "Application of Nanofluid Technology to Improve Oil Recovery in Oil and Gas Wells," in SPE International Oilfield Nanotechnology Conference 2012, pp. 46-51, SPE 154827. The nanoparticles stabilize an emulsion of the hydrocarbon phase dispersed within the aqueous phase of the suspension or an emulsion of the aqueous phase dispersed within the hydrocarbon phase. The stabilized emulsion is transported to the surface where the emulsion may be destabilized and the hydrocarbons recovered therefrom.

Figure 1:
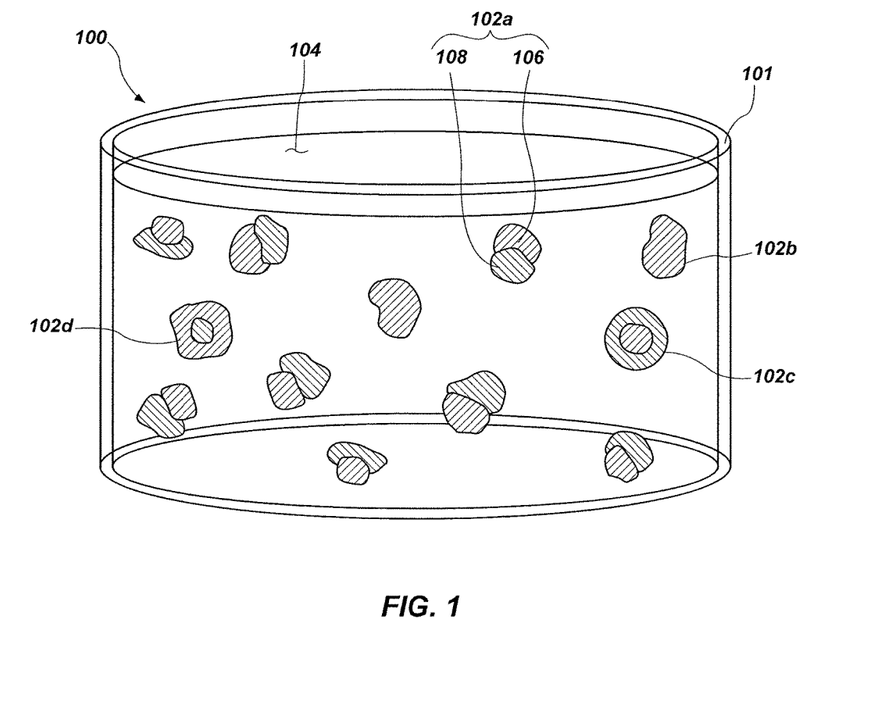
FIG. 1 is a simplified side view illustrating an embodiment of a suspension according to the present disclosure.

FIG. 1 is a simplified side view illustrating a suspension 100 (within a container 101) having a plurality of nanoparticles 102a, 102b, 102c, 102d (referred to generally herein as "nanoparticles 102") dispersed within a fluid 104. The fluid 104 may include, for example, water, brine, steam, an organic solvent, carbon dioxide, light hydrocarbons (e.g., propane, butane, etc.), or any combination thereof. The pH or other properties of the fluid 104 may be selected to control the distribution of the nanoparticles 102 in the fluid 104.

At least some nanoparticles 102 may include both silica 106 and carbon 108 in the same particle. For example, nanoparticles 102a may include nanoparticles of silica 106 bonded to or attached to nanoparticles of carbon 108. Some nanoparticles 102b may include a mixture of silica and carbon. Other nanoparticles 102c may include silica 106 coated or otherwise treated with carbon 108 or a carbon-containing compound, such as graphite, graphene, graphene oxide, carbon nanotubes, carbon nanodots (or quantum dots), nanodiamonds (i.e., nanoparticles of carbon having $sp^3$ hybridization), fullerenes, etc. Certain nanoparticles 102d may include carbon 108 coated or otherwise treated with silica 106 or another silicon-containing compound. In embodiments in which the nanoparticles 102 include carbon nanotubes, the carbon nanotubes may be single-walled carbon nanotubes (SWCNTs), multi-walled carbon nanotubes (MWCNTs), or combinations thereof. The carbon 108 and/or the silica 106 may be functionalized with one or more functional groups.

For example, surfaces of the silica 106 may be functionalized with one or more functional groups to impart desired physical and chemical properties to the surface of the nanoparticles 102, such as to improve reaction with the carbon 108 or carbon-containing compound. In some embodiments, the silica 106 may be fumed silica nanoparticles, amorphous silica nanoparticles, or any other type or morphology of silica. For example, the silica 106 may be colloidal silica made by growing mono-dispersed, negatively charged, amorphous silica particles in water. Such colloidal silica is sold by Nissan Chemical America Corporation, of Houston, Tex., under the trade name SNOWTEX®. Surfaces of the silica 106 may include hydroxyl ($OH^-$) ions, and the silica 106 may be stabilized in a suspension by repulsion between negatively charged particles. Functionalization of silica particles is described in U.S. Patent Application Publication 2015/0218435, published Aug. 6, 2015 titled "Nano-Surfactants for Enhanced Hydrocarbon Recovery, and Methods of Forming and Using Such Nano-Surfactants."

The carbon 108 may be deposited or attached to the silica 106 by physical or chemical bonds. For example, hydroxyl groups on the surfaces of the silica 106 may bond with the carbon 108.

The nanoparticles 102 may be structured and formulated to react with hydrocarbons and other carbon-containing materials present within a subterranean formation. By way of non-limiting example, contacting a porous, hydrocarbon-containing material with a suspension 100 including the nanoparticles 102 may form an emulsion at locations where the suspension 100 contacts the porous material. The nanoparticles 102 may stabilize the emulsion during transportation of the emulsion to the surface of the subterranean formation.

The nanoparticles 102 may include one or more functional groups configured and formulated to increase an interaction between the nanoparticles 102 and at least one of the subterranean formation, hydrocarbons within the subterranean formation, and other nanoparticles (if any) within the suspension 100. Functionalization of nanoparticles is described in, for example, U.S. Patent Application Publication 2014/0187449, titled "Functionalized Silicate Nanoparticle Composition, Removing and Exfoliating Asphaltenes with Same," published Jul. 3, 2014, the entire disclosure of which is hereby incorporated herein by reference.

In some embodiments, the suspension 100 may include a mixture of nanoparticles 102 having different properties. For example, a mixture of nanoparticles 102 may include a portion of nanoparticles 102 with at least one type of functional group and at least another portion of nanoparticles 102 with at least another type of functional group. In certain embodiments, each of the nanoparticles 102 may include more than one type of functional group.

In some embodiments, silica nanoparticles may be coated with graphene or another carbon-containing material by functionalizing outer surfaces of the silica nanoparticles with a charged species (e.g., cationic functional groups or anionic functional groups) and then immersing the functionalized silica nanoparticles in a solution containing an oppositely charged species, such as a graphene species having a charge opposite to the charged species on the surfaces of the silica nanoparticles.

In other embodiments, at least one type of nanoparticle (e.g., containing silica 106) may be attached to at least another type of nanoparticle (e.g., containing carbon 108) by at least one covalent bond. Such nanoparticles may be bonded to each other by coupling reactions to form the nanoparticles 102.

In some embodiments, the nanoparticles 102 may exhibit a mean diameter from about 1 nm to about 100 nm, such as from about 5 nm to about 50 nm. For example, the nanoparticles 102 may exhibit a mean diameter of about 40 nm. The nanoparticles 102 may have any selected particle-size distribution (i.e., any selected distribution of particle diameters). For example, the nanoparticles 102 may be monomodal (i.e., having diameters clustered around a single mode), bi-modal, etc.

The nanoparticles 102 may be hydrophilic or may contain a hydrophilic material. For example, if the nanoparticles 102 have one or more functional groups attached thereto, a functional group may be selected to make the nanoparticles 102 more hydrophilic.

In addition to the nanoparticles 102, the suspension 100 may include at least one additive. By way of non-limiting example, the additive may be at least one of a surfactant, a catalyst, a dispersant, a scale inhibitor, a scale dissolver, a defoamer, a biocide, or another additive used in the well-service industry. The suspension 100 may be substantially homogeneous (e.g., the nanoparticles 102 and the additive, if present, may be uniformly dispersed throughout the suspension 100), or may be heterogeneous (e.g., the nanoparticles 102 and the additive, if present, may be non-uniformly dispersed throughout the suspension 100).

The suspension 100 may be formed by dispersing the nanoparticles 102 in the fluid. In some embodiments, the nanoparticles 102 may be formed by mixing solid carbon 108 with nanoparticles comprising silica 106 in a liquid medium, then evaporating the liquid. As the liquid evaporates, the nanoparticles 102 may form from the silica 106 and carbon 108. At least some of the nanoparticles 102 may include both silica 106 and carbon 108. The solid carbon 108 and the silica 106 may be mixed in an acidic or basic medium. For example, a basic medium may promote dispersion of particles due to interactions between hydroxyl groups of the solid with hydroxyl groups of the liquid. As the liquid evaporates, the carbon 108 may become bonded to the silica 106. In some embodiments, the carbon 108 and/or the silica 106 may be in the form of nanoparticles, and the nanoparticles may bond to one another during evaporation of the liquid to form the nanoparticles 102.

The nanoparticles 102 may then be dispersed in any appropriate fluid 104, such as those fluids conventionally used for enhanced oil recovery (EOR) processes. For example, the nanoparticles 102 may be dispersed in water, brine, steam, carbon dioxide, a light hydrocarbon, (e.g., propane, butane, etc.) an organic solvent (e.g., methanol, ethanol, propanol, hexane, heptane, toluene, benzene, etc.), or any combination thereof.

In some embodiments, the nanoparticles 102 may be formed by chemical reaction. For example, reaction of functionalized carbon 108 with hydroxyl groups of silica 106 may form nanoparticles 102 having covalent bonds. Functionalization of carbon 108 may be either hydrophilic or hydrophobic.

The nanoparticles 102 may be formulated to be compatible with other components (e.g., materials, constituents, etc.) of the suspension 100. As used herein, the term "compatible" means that a material does not impair the functionality of another material used in conjunction therewith.

The suspension 100 may be formulated to include a concentration of the nanoparticles 102 ranging from about 10 ppm to about 10,000 ppm. For example, the suspension 100 may have a concentration of the nanoparticles 102 ranging from about 10 ppm to about 100 ppm, from about 100 ppm to about 500 ppm, from about 500 ppm to about 1,000 ppm, from about 1,000 ppm to about 2,000 ppm, from about 2,000 ppm to about 5,000 ppm, or from about 5,000 ppm to about 10,000 ppm.

The suspension 100 may be introduced into a subterranean formation to detach a hydrocarbon material from surfaces of the subterranean formation and form a stabilized emulsion containing the hydrocarbon material. The suspension 100 may be provided into the subterranean formation through conventional processes. For example, pressurized steam may be pumped into an injection well extending to a desired depth in the subterranean formation, and may infiltrate (e.g., permeate, diffuse, etc.) into interstitial spaces of the subterranean formation. The extent to which the suspension 100 infiltrates the interstitial spaces of the subterranean formation at least partially depends on the properties of the suspension 100 (e.g., density, viscosity, material composition (e.g., properties of the nanoparticles 102), etc.), and the hydrocarbon materials (e.g., molecular weight, density, viscosity, etc.) contained within interstitial spaces of the subterranean formation, as well as on the nature of the hydrocarbons within the formation and formation porosity.

The nanoparticles 102 may be structured and formulated to facilitate formation of a stabilized emulsion containing a hydrocarbon material. For example, the nanoparticles 102 may be structured and formulated to gather (e.g., agglomerate) at, adhere to, and/or absorb to interfaces of a hydrocarbon material and an aqueous material (e.g., the fluid 104 or another fluid) to form an emulsion comprising units (e.g., droplets) of one of the hydrocarbon material and the aqueous material dispersed in the other of the hydrocarbon material and the aqueous material. The nanoparticles 102 may prevent the dispersed material (e.g., the hydrocarbon material or the aqueous material) from coalescing, and may thus maintain the dispersed material as units throughout the other material.

The emulsion including the nanoparticles and hydrocarbons may include the same, a higher, or a lower concentration of the nanoparticles than the suspension 100. Furthermore, in some embodiments, the suspension 100 may be diluted or otherwise mixed with another fluid before injection into a well.

Due to the particle-size distribution of the nanoparticles 102, the suspension 100 may be particularly useful for contacting hydrocarbons disposed within pores defined by the subterranean formation, particularly within nanopores (i.e., pores having a maximum opening of about 1 micron or less). That is, the nanoparticles 102 and the fluid 104 may penetrate into pores and voids in the formation, and may promote separation of hydrocarbons from such pores and voids. Without being bound to any particular theory, it appears that the relatively large specific surface area of nanoparticles 102, the ability of the nanoparticles 102 to travel into small volumes, and the possibility of better interaction with the oil in pore bodies and on pore surfaces improve the effectiveness of oil recovery from porous formations.

The surface-to-volume ratio is higher for smaller particles than for larger particles. Thus, results based on surface interactions can be achieved at relatively lower solids concentrations when the solids are provided as nanoparticles 102. This may assist in keeping the materials and process costs low.

The silica 106 may help to "peel off" crude oil or other hydrocarbon-based material deposited on rock surfaces. A theory of "disjoining pressure," which appears to at least partially characterize this effect is described in, for example, U.S. Patent Application Publication 2010/0096139, titled "Method for Intervention Operations in Subsurface Hydrocarbon Formations," published Apr. 22, 2010, the entire disclosure of which is hereby incorporated herein by reference. The carbon 108 may help exfoliate bitumen and improve flow through throats of the pores. Stabilization of emulsion droplets by the nanoparticles 102 appears to depend upon the particle-particle interactions. Thus, the combination of the carbon 108 and the silica 106 may simultaneously improve oil removal from rock surfaces and exfoliation.

In some embodiments, the nanoparticles 102 may include both hydrophobic and hydrophilic domains. The hydrophilic domain may improve dispersion in water and improve compatibility with water-based fluids. The hydrophobic domain may trap organic compounds and stabilize the organic compounds, allowing the organic compounds to be removed from the formation.

The process of extracting hydrocarbons from subsurface formations may include flowing (e.g., driving, sweeping, forcing, etc.) the stabilized emulsion from the subterranean formation to the surface. The nanoparticles 102 prevent the dispersed material from coalescing and enable substantial removal of hydrocarbons from the subterranean formation.

Figure 2:
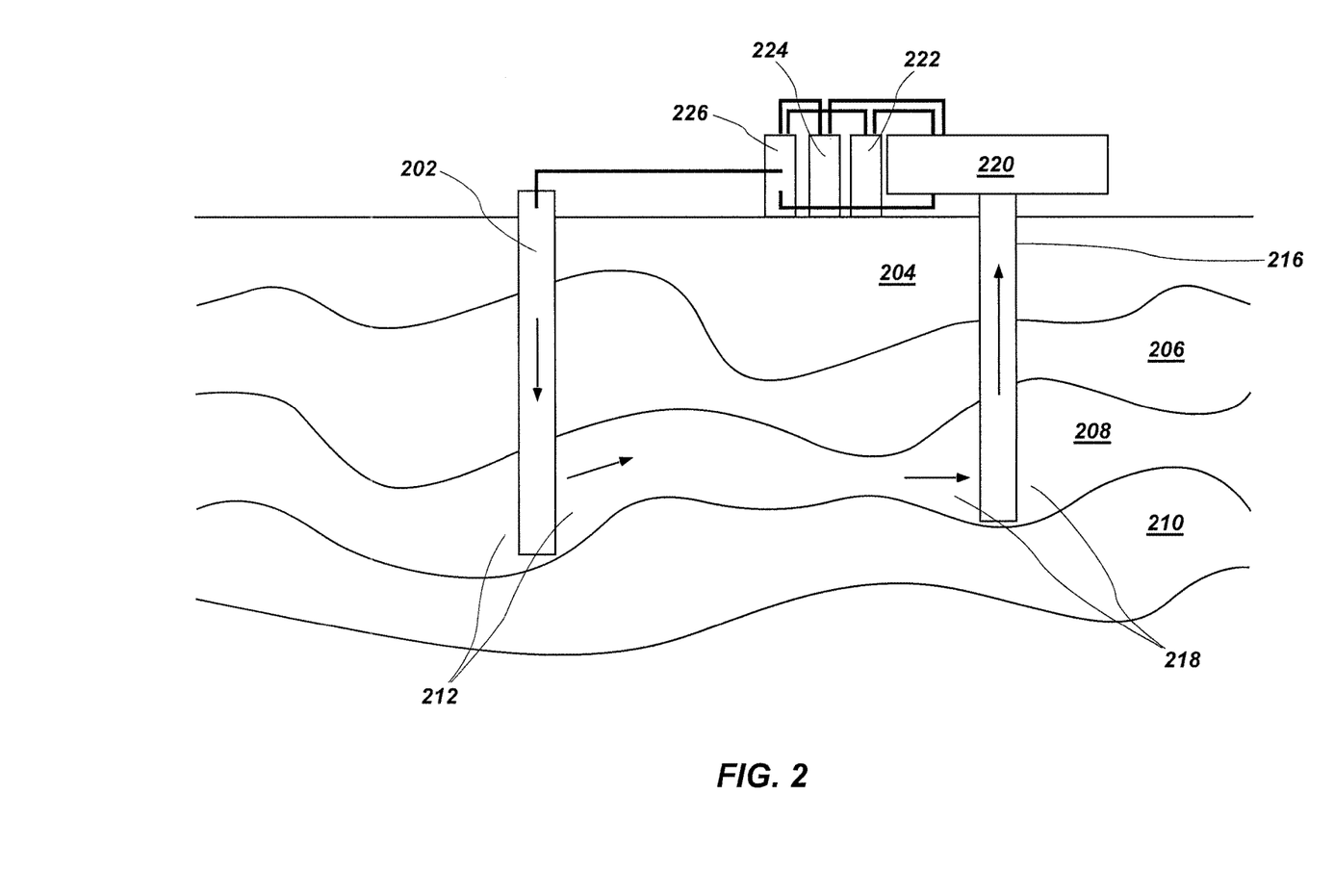
FIG. 2 is a simplified schematic showing how the suspension shown in FIG. 1 may be used for recovering hydrocarbons from subterranean formations.

FIG. 2 is a simplified schematic showing how the suspension 100 shown in FIG. 1 may be used for recovering hydrocarbons from subterranean formations. A first well 202 may traverse subterranean formations 204 and 206, and may have openings at a formation 208 over a formation 210. Portions 212 of the formation 208 may be optionally fractured and/or perforated. A second well 216 may traverse the subterranean formations 204 and 206, and may have openings at the formation 208. Portions 218 of the formation 208 may be optionally fractured and/or perforated.

The suspension 100 (FIG. 1) may be introduced into the formation 208. A stabilized emulsion of the suspension 100 and hydrocarbons within the formation 208 may form, and may be removed from the formation 208 through the portions 218 thereof. The emulsion may travel up the second well 216 to a production facility 220. The production facility 220 at the surface may include pumps, filters, storage tanks, and other equipment for recovering hydrocarbons. The production facility 220 may separate the recovered hydrocarbons from at least a portion of the suspension 100. For example, gases may be stored in a first tank 222, liquid hydrocarbons may be stored in a second tank 224, and the portion of the suspension 100 may be stored in a third tank 226. The suspension 100 may be reintroduced to the formation 208 through the first well 202.

Once the hydrocarbons are removed from the subterranean formation, at least a portion of the emulsion may be destabilized to form distinct, immiscible phases including an aqueous phase and a hydrocarbon phase. One or more properties (e.g., temperature, pH, material composition, pressure, etc.) of the stabilized emulsion or the aqueous phase may be modified (e.g., altered, changed) to at least partially destabilize the emulsion. For example, the pH of the aqueous phase may be modified to increase the solubility of the nanoparticles 102 within the aqueous phase and destabilize the emulsion, forming distinct, immiscible phases. In some embodiments, the aqueous phase may be separated from the hydrocarbon phase by decreasing a pH of the emulsion. The pH of the emulsion may be decreased by adding hydrochloric acid, phosphoric acid, acetic acid, another acid, or combinations thereof to the emulsion.

A demulsifier may be added to the emulsion to destabilize the emulsion and form distinct, immiscible phases including an aqueous phase and the hydrocarbon phase. In some embodiments, the emulsion is destabilized by adjusting the pH of at least one of the aqueous phase and the emulsion and by adding a demulsifier to the emulsion. In some embodiments, at least a portion of the nanoparticles 102 may be recovered and recycled for use in subsequent operations.

EXAMPLES

Example 1: Oil Recovery from Canadian Oil Sand from Athabasca

Commercially available silica nanoparticle dispersions were obtained from Nissan Chemical America Corporation, of Houston, Tex. The silica nanoparticles had a mean particle diameter from about 5 nm to about 40 nm, and the particles were dispersed in water (product numbers for each sample are shown in Table 1, below). The silica nanoparticles were coated with carbon quantum dots by mixing carbon particles into the dispersions. The liquid phase was then evaporated, leaving particles of silica and carbon.

The particles were redispersed in deionized water and mixed with Canadian sands in glass vials. The vials were heated to approximately 80° C. for 10 days, and the color of the liquid phase was observed (with darker color corresponding to more oil removed from the sand). The liquid phase was then removed and the sand was dried and analyzed with an optical microscope (with lighter sand color corresponding to more oil removed from the sand). The sand was analyzed by thermogravimetric analysis (TGA) to determine differences in materials that decompose at elevated temperatures. Table 1 shows the results of the tests, with oil recovery determined by the change in color of the liquid phase, the change in color of the dried sand, and the TGA curves.

TABLE 1

| Sample # | Nissan Chemical America product number | Mean particle diameter of silica (before adding carbon) | Oil recovery |
| --- | --- | --- | --- |
| Water | n/a | n/a | No |
| 1 | 250624 | 5 nm | Yes |
| 2 | 210818 | 8 nm | Yes |
| 3 | 240707 | 40 nm | Yes |
| 4 | 131204 | 12 nm | Yes |
| 5 | LB130410 | 50 nm | Yes |

Example 2: Oil Dispersion

A commercially available silica nanoparticle dispersion was obtained from Nissan Chemical America Corporation, of Houston, Tex. (240707). The silica nanoparticles had a mean particle diameter of about 40 nm, and the particles were dispersed in water. One portion of the silica nanoparticles was coated with carbon quantum dots by mixing carbon particles into the dispersions. The liquid phase was then evaporated, leaving particles of silica and carbon. The particles were redispersed in deionized water. Another portion of the silica particles was used without the carbon modification.

Both portions were mixed with oil in glass vials. The vials were heated to approximately 60° C., and the color and consistency of the liquid phases were observed (with darker color corresponding to more oil in a phase). Table 2 shows the results of the tests, with oil dispersion determined by the change in color of the liquid phases and the separation of the phases.

TABLE 2

| Sample # | Composition of particles | Oil dispersion |
| --- | --- | --- |
| Water | n/a | No - water phase remained almost entirely clear while oil phase was dark |
| 6 | Silica only | Some - two phases were present and water phase was lighter than oil phase (but appreciably darker than the control sample) |
| 7 | Silica and carbon | Yes -the oil and water appeared to form a single liquid phase |

Additional non limiting example embodiments of the disclosure are described below.

Embodiment 1

A suspension for removing hydrocarbons from a subterranean formation, comprising a fluid comprising at least one of water, brine, steam, carbon dioxide, a light hydrocarbon, and an organic solvent; and a plurality of nanoparticles dispersed with the fluid. At least some nanoparticles of the plurality comprise both silica and carbon.

Embodiment 2

The suspension of Embodiment 1, wherein the at least some nanoparticles of the plurality comprise a silica nanoparticle attached to at least one material selected from the group consisting of carbon nanodots, graphene, graphene oxide, carbon nanotubes, and functionalized carbon nanotubes.

Embodiment 3

The suspension of Embodiment 1 or Embodiment 2, wherein the at least some nanoparticles of the plurality of nanoparticles exhibit a mean diameter from about 5 nm to about 50 nm.

Embodiment 4

The suspension of any of Embodiments 1 through 3, wherein the at least some nanoparticles of the plurality are hydrophilic.

Embodiment 5

The suspension of any of Embodiments 1 through 4, wherein the at least some nanoparticles of the plurality comprise silica and carbon bonded by hydroxyl groups.

Embodiment 6

The suspension of any of Embodiments 1 through 5, further comprising a surfactant.

Embodiment 7

A method comprising forming a plurality of nanoparticles to comprise silica and carbon, and dispersing the plurality of nanoparticles with a fluid to form a suspension comprising the nanoparticles.

Embodiment 8

The method of Embodiment 7, further comprising introducing the suspension into a subterranean formation and contacting hydrocarbons within the subterranean formation with the suspension to form an emulsion comprising the nanoparticles, an aqueous phase, and a hydrocarbon phase dispersed within the aqueous phase.

Embodiment 9

The method of Embodiment 8, wherein contacting the subterranean formation with the suspension comprises contacting hydrocarbons within nanopores of the subterranean formation.

Embodiment 10

The method of Embodiment 8 or Embodiment 9, further comprising transporting the emulsion to a surface of the subterranean formation and separating hydrocarbons from the emulsion.

Embodiment 11

The method of any of Embodiments 7 through 10, wherein forming a plurality of nanoparticles comprises forming nanoparticles comprising silica and at least one material selected from the group consisting of carbon nanodots, graphene, graphene oxide, carbon nanotubes, and functionalized carbon nanotubes.

Embodiment 12

The method of any of Embodiments 7 through 11, wherein forming a plurality of nanoparticles comprises reacting carbon with nanoparticles comprising silica.

Embodiment 13

The method of Embodiment 12, wherein reacting carbon with nanoparticles comprising silica comprises reacting carbon with nanoparticles comprising silica in a liquid medium and evaporating the liquid.

Embodiment 14

The method of Embodiment 13, wherein reacting carbon with nanoparticles comprising silica in a liquid medium comprises reacting carbon with nanoparticles comprising silica in a basic medium.

Embodiment 15

The method of any of Embodiments 7 through 14, wherein forming a plurality of nanoparticles comprises bonding carbon to silica.

Embodiment 16

The method of Embodiment 15, wherein bonding carbon to silica comprises bonding nanoparticles comprising carbon to nanoparticles comprising silica.

Embodiment 17

A method of recovering a hydrocarbon material, the method comprising introducing a suspension into a subterranean formation containing hydrocarbons, forming a stabilized emulsion of the suspension and the hydrocarbons within the subterranean formation; and removing the emulsion from the subterranean formation. The suspension comprises a plurality of nanoparticles, and at least some nanoparticles of the plurality comprise silica and carbon.

Embodiment 18

The method of Embodiment 17, wherein introducing a suspension into a subterranean formation comprises introducing the at least some nanoparticles comprising silica and at least one material selected from the group consisting of carbon nanodots, graphene, graphene oxide, carbon nanotubes, and functionalized carbon nanotubes.

Embodiment 19

The method of Embodiment 17 or Embodiment 18, wherein introducing a suspension into a subterranean formation comprises introducing the at least some nanoparticles having a mean diameter from about 5 nm to about 50 nm.

Embodiment 20

The method of any of Embodiments 17 through 19, further comprising introducing the at least some nanoparticles into voids defined by the subterranean formation.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the disclosure as contemplated by the inventors. Further, embodiments of the disclosure have utility with different and various particle types and formulations.

What is claimed is:

1. A method comprising:
   functionalizing a plurality of silica nanoparticles with a charged species;
   coating the plurality of silica nanoparticles with carbon nanodots to form a plurality of nanoparticles comprising a mixture of silica nanoparticles and carbon nanodots, wherein the carbon nanodots have a charge opposite a charge of the charged species;
   dispersing and stabilizing the plurality of nanoparticles within a fluid to form a suspension; and
   introducing the suspension into a subterranean formation.

2. The method of claim 1, further comprising:
   contacting hydrocarbons within the subterranean formation with the suspension to form an emulsion comprising the nanoparticles, an aqueous phase, and a hydrocarbon phase dispersed within the aqueous phase.

3. The method of claim 2, wherein contacting the subterranean formation with the suspension comprises contacting hydrocarbons within nanopores of the subterranean formation.

4. The method of claim 2, further comprising:
   transporting the emulsion to a surface of the subterranean formation; and
   separating hydrocarbons from the emulsion.

5. The method of claim 1, wherein coating the plurality of silica nanoparticles with carbon nanodots comprises reacting carbon with the silica nanoparticles.

6. The method of claim 5, wherein reacting carbon with the silica nanoparticles comprises:
   reacting carbon with the silica nanoparticles in a liquid medium; and
   evaporating the liquid.

7. The method of claim 6, wherein reacting carbon with the silica nanoparticles in a liquid medium comprises reacting carbon with the silica nanoparticles in a basic medium.

8. The method of claim 1, wherein coating the plurality of silica nanoparticles with carbon nanodots comprises bonding carbon to silica.

9. The method of claim 8, wherein bonding carbon to silica comprises bonding carbon to silica by hydroxyl groups.

10. The method of claim 1, wherein coating the plurality of silica nanoparticles comprises coating nanoparticles having a mean diameter from about 5 nm to about 50 nm.

11. The method of claim 1, wherein coating the plurality of silica nanoparticles comprises forming hydrophilic nanoparticles.

12. The method of claim 1, further comprising mixing a surfactant in the fluid.

13. A method of recovering a hydrocarbon material, the method comprising:
   functionalizing a plurality of silica nanoparticles with a charged species;
   coating the plurality of silica nanoparticles with carbon nanodots to form a mixture of silica nanoparticles and carbon nanodots, wherein the carbon nanodots have a charge opposite a charge of the charged species;
   forming a suspension comprising a plurality of nanoparticles, at least some nanoparticles of the plurality comprising the mixture of silica nanoparticles and carbon nanodots;
   introducing the suspension into a subterranean formation containing hydrocarbons;
   forming a stabilized emulsion of the suspension and the hydrocarbons within the subterranean formation; and
   removing the emulsion from the subterranean formation.

14. The method of claim 13, wherein coating the plurality of silica nanoparticles with carbon nanodots comprises coating silica nanoparticles having a mean diameter from about 5 nm to about 50 nm.

15. The method of claim 13, further comprising introducing the at least some nanoparticles into voids defined by the subterranean formation.

16. The method of claim 13, further comprising separating the hydrocarbons from the emulsion after removing the emulsion from the subterranean formation to form the suspension.

17. The method of claim 16, further comprising reintroducing the suspension into the subterranean formation.

18. The method of claim 13, further comprising decreasing a pH of the emulsion after removing the emulsion from the subterranean formation.

19. The method of claim 13, further comprising adding a demulsifier to the emulsion to form an aqueous phase and a hydrocarbon phase, wherein the hydrocarbon phase is immiscible in the aqueous phase.

\* \* \* \* \*

UNITED STATES PATENT AND TRADEMARK OFFICE
CERTIFICATE OF CORRECTION

PATENT NO. : 10,155,899 B2
APPLICATION NO. : 14/744520
DATED : December 18, 2018
INVENTOR(S) : Devesh Kumar Agrawal, Sankaran Murugesan and Valery N. Khabashesku It is certified that error appears in the above-identified patent and that said Letters Patent is hereby corrected as shown below:

In the Specification
Column 2, Line 59, change "the singular foams" to --the singular forms--
Column 4, Line 37, change "Aug. 6, 2015 titled" to --Aug. 6, 2015, titled--
Column 8, Line 42, change "Canadian sands in" to --Canadian oil sands in--

Signed and Sealed this
Fifteenth Day of January, 2019

Andrei Iancu
*Director of the United States Patent and Trademark Office*